United States Patent [19]

Liu

[11] Patent Number: 4,529,629

[45] Date of Patent: Jul. 16, 1985

[54] ADDITION CURABLE COMPOSITIONS PREPARED FROM SILICONE BLOCK COPOLYMERS

[75] Inventor: Wan-Li Liu, Ballston Lake, N.Y.

[73] Assignee: General Electric Company, Waterford, N.Y.

[21] Appl. No.: 618,651

[22] Filed: Jun. 8, 1984

[51] Int. Cl.$^3$ .............................................. B05D 3/02
[52] U.S. Cl. .................... 427/387; 428/447; 528/15; 528/31; 528/32; 528/901; 525/477; 525/478; 427/58
[58] Field of Search ............... 528/15, 31, 32, 901; 525/477, 478; 427/387, 58; 428/447

[56] References Cited

U.S. PATENT DOCUMENTS

| | | | |
|---|---|---|---|
| 3,280,214 | 10/1966 | Mitchell | 260/825 |
| 3,294,718 | 12/1966 | Antonen | 260/18 |
| 3,308,203 | 3/1967 | Metevia et al. | 260/825 |
| 3,436,366 | 4/1969 | Modic | 260/37 |
| 3,527,655 | 9/1970 | Ballard | 117/72 |
| 3,882,083 | 5/1975 | Berger et al. | 260/46.5 UA |
| 4,061,609 | 12/1977 | Bobear | 260/9 |
| 4,196,273 | 4/1980 | Imai et al. | 528/15 |
| 4,329,273 | 5/1982 | Hardman et al. | 524/862 |
| 4,348,504 | 9/1982 | Butler et al. | 525/477 |
| 4,356,293 | 10/1982 | Deubzer et al. | 525/477 |

Primary Examiner—Melvyn I. Marquis
Attorney, Agent, or Firm—Gary L. Loser

[57] ABSTRACT

There is provided a curable composition comprising:
(A) an organopolysiloxane block copolymer comprising:
  (i) at least one siloxane block consisting essentially of from about 6 to about 120 units of the formula $R_2SiO$,
  (ii) at least one siloxane block consisting essentially of from about 3 to about 160 units of the formula $R^1SiO_{1.5}$,
  (iii) optionally, at least one siloxane block consisting essentially of from 1 to about 80 units of the formula $R^2SiO_{1.5}$, and
  (iv) at least one siloxane block consisting essentially of from about 0.1 to about 10 mole percent of the sum of (i), (ii) and (iii) of units of the formula $RR^3SiO$, where R is a $C_{1-5}$ substituted or unsubstituted alkyl radical or a $C_{6-10}$ substituted or unsubstituted aryl or alkaryl radical, $R^1$ is a $C_{6-10}$ substituted or unsubstituted aryl or alkaryl radical, $R^2$ is a $C_{1-5}$ substituted or unsubstituted alkyl radical and $R^3$ is a $C_{2-5}$ alkenyl radical;

(B) an organohydrogenpolysiloxane, and
(C) a catalyst.

30 Claims, No Drawings

ADDITION CURABLE COMPOSITIONS PREPARED FROM SILICONE BLOCK COPOLYMERS

BACKGROUND OF THE INVENTION

The present invention generally relates to compositions made from organosilicon block copolymers and to methods for making such compositions. More particularly, the present invention relates to novel silicone compositions prepared from organosilicon block copolymers having at least one block of diorganosiloxane units, at least one block of trifunctional arylsiloxane units, optionally, at least one block of trifunctional alkylsiloxane units, and at least one block of organoalkenylsiloxane units, and organohydrogenpolysiloxanes.

Random copolymers, although made from two or more monomers which each have at least one desirable property, do not have properties intermediate the homopolymers. An example would be to copolymerize monomer A which normally gives a hard and brittle film with monomer B which normally gives a soft and flexible film. The object of such copolymerization would be to produce a copolymer having properties intermediate those of homopolymers A and B, for example, to provide a copolymer having a hard but flexible film. With random copolymers it was found that the copolymer would generally be brittle or would still be soft, and the desired intermediate properties would not be obtained. Some improvement might be realized such as the hard and brittle polymer might be more flexible, but only marginally so.

During the past few years a great deal of interest has been shown in "sequential" or "block" copolymers. Although the same monomers and percentages of monomers make up the composition of the random copolymers and the block copolymers, the final polymers in each case differ widely in their properties. Thus, for example, a block copolymer made of monomer A and monomer B may provide the hard but flexible film which was not obtained with the random copolymer.

Mitchell, U.S. Pat. No. 3,280,214, discloses organosiloxane block copolymers wherein a diorganopolysiloxane block and a mono-organosiloxane block are joined through a coupling unit having the general formula

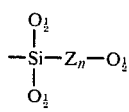

wherein Z is selected from the group consisting of

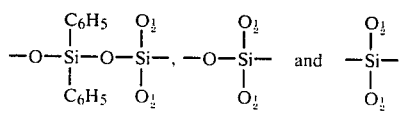

and wherein n is 0 or 1. Curing catalysts which accelerate the condensation of residual silicon-bonded hydroxyl groups can be added to produce either a resinous or rubbery product.

Antonen, U.S. Pat. No. 3,294,718, describes a method for making organosilicon block copolymers consisting of blocks of essentially linear silicon-containing material and blocks or resinous silicon-containing material. Block copolymers prepared according to this method are also cured by any conventional condensation curing catalyst.

Metevia, U.S. Pat. No. 3,308,203, teaches organopolysiloxane block copolymers which utilize organic peroxides as vulcanizing agents, i.e., curing is effected simply by heating the peroxide-containing composition at a temperature above the decomposition point of the peroxide vulcanizing agent.

Addition reactions between compounds containing silicon-hydrogen linkages and compounds containing aliphatic unsaturation are well known in the art. These reactions are generally effected in the presence of a precious metal catalyst such as platinum or a platinum complex. The reader interested in obtaining more detailed information relating to hydrosilation reactions and suitable catalysts therefor is referred to U.S. Pat. Nos. 2,823,218, 2,970,150, 3,159,601, 3,159,662, 3,220,972, 3,419,593, 3,436,366, 3,527,655, 3,814,730, 3,882,083, 4,061,609, 4,196,273 and 4,329,273. Each of the foregoing patents is incorporated by reference into the instant disclosure for its teaching relating to addition reactions between compounds containing hydrogen-silicon linkages and olefinically unsaturated compounds. It should be noted that all of the compositions prepared according to these patents are prepared from organohydrogenpolysiloxanes and homopolymers or random copolymers.

Significantly, to my knowledge, there are no reports of research successfully concluded in connection with compositions prepared from addition of organohydrogenpolysiloxanes and siloxane block copolymers. It is believed that this dearth of technological information in the seemingly analagous addition of hydrogensiloxanes to siloxane block copolymers having sites of unsaturation points to the failure of others to develop an operative synthesis or products with suitable properties, rather than to any lack of interest in the matter. Such failure of others is probably due to the known fact that addition curable polydiorganosiloxanes results in silicone compositions having very poor strength and other physical and mechanical properties.

SUMMARY OF THE INVENTION

It is therefore an object of the present invention to provide novel addition curable compositions comprising an organohydrogenpolysiloxane, an organopolysiloxane block copolymer, and an amount of precious metal catalyst effective for promoting crosslinking of the foregoing polysiloxanes.

It is another object of the present invention to provide clear and hard addition cured silicone compositions having excellent mechanical and physical properties and which are useful as dirt-repellent coatings or conformal coatings.

Still another object of the present invention is to provide methods for making the aforesaid compositions.

The stated objects are accomplished in one aspect by an addition curable compositions comprising:

(A) 100 parts by weight of a polysiloxane block copolymer comprising:

(i) a block having from about 6 to about 120 units of the formula

(ii) a block having from about 3 to about 160 units of the formula

(iii) optionally, a block having from 1 to about 80 units of the formula

and (iv) from about 0.1 to about 10 mole percent of (i), (ii) and (iii) of units of the formula

where R is an alkyl radical of 1 to 5 carbon atoms or an aryl or alkaryl radical of 6 to 10 carbon atoms, but most preferably is methyl; $R^1$ is an aryl or alkaryl radical of 6 to 10 carbon atoms, preferably phenyl or tolyl and most preferably phenyl; $R^2$ is an alkyl radical of 1 to 5 carbon atoms, preferably methyl, and $R^3$ is an alkenyl radical of 2 to 5 carbon atoms, preferably vinyl or allyl and most preferably vinyl;

(B) an amount of organohydrogenpolysiloxane sufficient to provide from about 0.5 to about 5.0 silicon-bonded hydrogen atoms per silicon-bonded alkenyl radical in (A)(iv); and (C) an amount of precious metal or precious metal-containing catalyst effective for promoting reaction between said silicon-bonded hydrogen atoms of (B) and said silicon-bonded alkenyl radicals of (A)(iv).

These and other objects will become clear from the following description taken together with the accompanying claims.

DESCRIPTION OF THE INVENTION

In accordance with one aspect of the present invention there is provided an addition curable silicone composition comprising:

(A) 100 parts by weight of an organopolysiloxane block copolymer comprising:
  (i) at least one block consisting essentially of from about 6 to about 120 units of the formula

(ii) at least one block consisting essentially of from about 3 to about 160 units of the formula

(iii) optionally, at least one block consisting essentially of from 1 to about 80 units of the formula

and (iv) at least one block consisting essentially of from about 0.1 mole percent to about 10 mole percent of (i), (ii) and (iii) of units of the formula

where R is an alkyl radical of 1 to 5 carbon atoms or an aryl or alkaryl radical of 6 to 10 carbon atoms, $R^1$ is an aryl or alkaryl radical of 6 to 10 carbon atoms, $R^2$ is an alkyl radical of 1 to 5 carbon atoms, and $R^3$ is an alkenyl radical of 2 to 5 carbon atoms, or substituted radical of any of the foregoing.

(B) An amount of an organohydrogenpolysiloxane sufficient to provide from about 0.5 to about 5.0 silicon-bonded hydrogen atoms per silicon-bonded alkenyl radical in (A)(iv); and (C) an amount of precious metal or precious metal containing catalyst effective for promoting an addition type reaction or crosslinking between said silicon-bonded hydrogen atoms of (B) and said silicon-bonded alkenyl radicals of (A)(iv).

Component (A)(i) of the organopolysiloxane block copolymer of the present invention may contain from about 6 to about 120 diorganopolysiloxane units, however, it is preferred that each such block of diorganopolysiloxane units present in the block copolymer contain from about 6 to about 50 of such repeating diorganopolsiloxane units. Most preferably there are present from about 12 to about 30 repeating diorganopolysiloxane units per block.

The R radicals bonded to the silicon atoms of the diorganopolysiloxane block are lower alkyl radicals or substituted alkyl radicals having from 1 to 5 carbon atoms, aryl or alkaryl radicals having from 6 to 10 carbon atoms, or substituted aryl or alkaryl radicals of 6 to 10 carbon atoms. Examples of such radicals include methyl, ethyl, propyl, butyl, 3,3,3-trifluoropropyl, B-cyanoethyl, phenyl, tolyl, chlorophenyl, bromophenyl cyanophenyl and the like. Preferably, all of the organo groups of the diorganopolysiloxane block are a mixture of methyl groups and phenyl groups, and most preferably all of the R groups are methyl radicals.

The diorganopolysiloxane blocks, especially dimethylpolysiloxane blocks, will provide flexibility to the cured composition in a manner analagous to the way linear dimethylpolysiloxanes impart elasticity to silicone sealants.

Component (A)(ii) of the organopolysiloxane block copolymer of the present invention has from about 3 to about 160 trifunctional aryl or alkaryl units per block. In the most preferred embodiment there are approximately 0.75 to 1.5 trifunctional units of this type per diorganosiloxane unit (e.g. 4 to 75 units). Thus, for example, if there are 18 dimethylsiloxane units in block (A)(i), there most preferably are from about 14 to about 27 trifunctional arylsiloxane units in block (A)(ii). Within a broader aspect of the present invention it is contemplated that a less preferred ratio is from about 0.5 to about 2 trifunctional aryl or alkaryl units per diorganosiloxane unit. In the broadest range, it is believed that there can be from about 0.1 to about 5 trifunctional siloxane units of this type per diorganosiloxane unit. The number of such arylsiloxane units per block and the number of such arylsiloxane blocks will be dependent upon the desired hardness or flexibility of the cured composition.

The $R^1$ radicals bonded to the silicon atoms of the trifunctional arylsiloxane block can have from 6 to about 10 carbon atoms. Preferably, such radicals are not substituted but in some instances the artisan may desire to use, for example, halogen or cyano substituted aryl or alkaryl radicals. Included within the scope of the $R^1$ radicals are, for example, phenyl, tolyl and xylyl, and halo or cyano groups attached thereto in place of a hydrogen atom. Most preferably all of the $R^1$ groups are phenyl radicals.

Trifunctional arylsiloxane units within the scope of (A)(ii) impart hardness to the material in much the same way a filler imparts tensile strength to a silicone sealant. Consequently, it is not critical that a reinforcing filler be included in the present composition.

Component (A)(iii) of the organopolysiloxane block copolymer consists essentially of from 1 to 80 trifunctional alkylsiloxane units. Alkyl trifunctional siloxy units are optional in the block copolymers of the present invention, but their inclusion in block copolymers provides particularly good compositions. Preferably such trifunctional alkylsiloxane units are present at about 10 mole percent of the trifunctional arylsiloxane units, however, they may be present from as little as about 5 mole percent to as much as about 50 mole percent of the arylsiloxane units. For example, if there are 18 dimethylsiloxane units and 14 to 27 trifunctional arylsiloxane units, there may be from 1 to about 14 alkylsiloxane units present. Most preferably there should be two or three alkylsiloxane units in the block.

The $R^2$ radicals of component (A)(iii) are selected from the alkyl R radicals as described hereinabove for component (A)(i). The alkyl radicals of the trifunctional alkylsiloxane block need not be the same as the alkyl radicals of the diorganosiloxane block. Most preferably R is also methyl in these blocks.

Trifunctional alkylsiloxane units, like the trifunctional arylsiloxane units, also impart strength and rigidity to the cured product.

Component (A)(iv), an essential block of the copolymer, is present in an amount of from about 0.1 to about 10 mole percent of the sum of components (A)(i), (A)(ii) and (A)(iii). More preferably the (A)(iv) units are present in an amount ranging from about 0.5 to about 3 mole percent of components (A)(i), (A)(ii) and (A)(iii), and most preferably the (A)(iv) units are present at about one mole percent of components (A)(i), (A)(ii) and (A)(iii). Thus, if there are 18 diorganosiloxane units, 18 trifunctional arylsiloxane units, and 3 trifunctional alkylsiloxane units present, the copolymer may contain from 1 to about 5 organo-alkenylsiloxane units, e.g. methylvinylsiloxane units.

The R radicals of component (A)(iv) are selected from the same R radicals described earlier for component (A)(i). It is not necessary that these R groups be the same as the other R groups but, preferably, all of the R groups are methyl.

The $R^3$ radicals of component (A)(iv) can be any unsaturated radical which is effective for use in precious metal catalyzed addition reactions. Generally, this includes alkenyl radicals of 2 to 5 carbon atoms such as vinyl and allyl. Most preferably $R^3$ is vinyl.

Organo-alkenylsiloxane units within the scope of component (A)(iv), in addition to providing sites for crosslinking, also impart flexibility to the block copolymer. Thus component (A)(iv) enables the artisan to simultaneously control both crosslink density and flexibility. Of course, as the block copolymer is made larger by including more than one block of each type, the number of crosslinking sites will also increase depending on the desired properties of the cured composition.

Monofunctionalsiloxane units and tetrafunctional siloxane units can also be present in the block copolymers of the present invention. These groups are not essential to the present invention but are not detrimental if present in limited amounts. The amounts of such monofunctional and tetrafunctional units which can be present are readily determined by the artisan without undue experimentation.

It will be apparent to those skilled in the art that block copolymer A is not limited to those copolymers having equal numbers of each type of block in the copolymer. Rather, the number of each type of block can be varied depending upon whether the cured composition is to be more rigid, and hence requiring more trifunctional units, or more flexible, and hence requiring more difunctional units. As mentioned previously, the organo-alkenylsiloxane units not only allow the flexibility of the cured composition to be adjusted, but also, the crosslink density can be affected by altering the number of organo-alkenylsiloxane blocks. Further, it is not critical that the blocks be present in any particular sequence.

Those skilled in the art will also appreciate that the degree of flexibility or rigidity can also be controlled by the number of siloxane units in a particular block. For example, if a more flexible composition is desired, the artisan can increase the length of the diorganosiloxane blocks. Of course, the effect on the composition will be different if the block length is increased instead of utilizing a larger number of diorganosiloxane blocks. The foregoing alterations and variations, as well as many others, are well within the skill of the artisan and do limit the spirit or scope of the present invention.

The block copolymers utilized in practicing the present invention can be prepared in a variety of ways well known to those skilled in the art. In a particularly preferred process 100 parts by weight of a silanol terminated diorganopolysiloxane having repeating units varying from 6 to 120 is placed in a reaction vessel containing from about 100 to 300 parts by weight of solvent such as toluene and from about 500 to about 1500 parts or more by weight water. The amount of solvent or water employed is not critical but no advantage is found in using excessively large quantities. Sufficient agitation is applied to to form a dispersion. An amount of phenyltrichlorosilane, methyltrichlorosilane and vinylmethyldichlorosilane in a solvent such as toluene are added to the reaction vessel containing the dispersion, while providing sufficient agitation to maintain the dispersion. The dispersion is stirred for anywhere from 15 minutes to 10 hours or more to effect reaction. The resultant aqueous phase contains reaction by-product such as hydrogen chloride while the organic phase contains the organopolysiloxane block copolymer. If desired the block copolymer can be further purified by washing with water and then azeotroping off residual water and acid.

The amount of the three silanes added to the initial dispersion can, of course, be varied as described hereinabove to provide a block copolymer which will impart to the cured composition the desired properties. It is important that the addition of the reactants be kept in order to produce the desired copolymer where large blocks are to be prepared. Where, however, the blocks are only of 1 or 2 repeating units, i.e. components (A)-(iii) and (A)(iv), all of the components can be mixed together.

Those skilled in the art will be able to adapt other well known but less preferred methods to make block copolymers suitable for use in the present invention. One such method is described in U.S. Pat. No. 3,280,214 to Mitchell, which patent is incorporated herein by reference. Briefly, Mitchell prepares block copolymers by (A) reacting (1) from 5 to 99 mole percent of an organopolysiloxane of the general formula

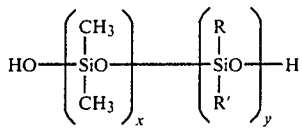

wherein each R and each R' is selected from methyl, ethyl, phenyl and vinyl radicals, x ranges from 5 to 400, y ranges from 0 to 40, there being no more than 10 mole percent organosiloxane units other than methyl-containing siloxane units in the polymer, the siloxane containing an average of from 1.9 to 2.0 organo groups per silicon atom, having a viscosity of from 25 to 1,000,000 cps. at 25° C., and an amount of suitable organic solvent from that portion necessary to provide a final solids concentration of 5 to 60 percent by weight and (2) an amount of at least one of the following molecules per hydroxyl group of (1) of a silicon-containing compound of the general formula Y—SiX₃ wherein Y is selected from halogen atoms, —OSiCl₃, —OSiBr₃

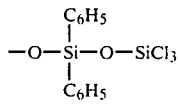

and —SiCl₃, where X is a halogen atom and containing an amount of a suitable organic solvent from that portion necessary to provide a final solids concentration of 5 to 60 percent by weight, in the presence of an acid acceptor and the above reaction continues until complete; (B) adding from 1 to 95 mole percent (3) of a silicon-containing compound selected from (a) a silane of the general formula R″SiX₃ where R″ is selected from aryl, alkaryl and halogenaryl radicals, and X is a halogen atom, (b) a hydrolysis product of (a), and (c) mixtures thereof; (C) hydrolyzing at a temperature of from 25° C. to 175° C. in water containing enough hydrogen halide to provide a solution of 0.01 to 30 percent by weight; (D) separating the organopolysiloxaneorganic phase from the aqueous phase and neutralizing and azeotroping dry the organic phase, (E) making the dried organopolysiloxane compatible by adding a silicon-bonded hydroxyl condensation catalyst, refluxing and then neutralizing the catalyst; and (F) concentrating the thus produced composition by driving off solvent, adding a curing catalyst and curing.

Another method which the artisan can adapt for use in making block copolymers suitable for practicing the present invention is disclosed by Antonen, U.S. Pat. No. 3,294,718, which is incorporated by reference into the present disclosure. This process is similar to that of Mitchell but eliminates the steps of washing and neutralizing.

Still another process which can be modified to produce suitable block copolymers is found in U.S. Pat. No. 3,308,203 to Metevia, and which is also incorporated herein by reference. This method involves (A) mixing and heating in a suitable solvent (1) 100 parts by weight of an organopolysiloxane which has an average of at least 200 silicon atoms per molecule and consisting essentially of $R_nSiO_{4-n/2}$, where R is selected from methyl, phenyl and vinyl radicals, n has an average value of 1.98 to 2.00, there being an average of at least 0.75 methyl radicals and an average of no more than 0.15 vinyl radicals per silicon atom in said siloxane, and no more than 50 mole percent of said siloxane being diphenylsiloxane units, said siloxane having an average of at least 2 silicon-bonded hydroxyl radicals per molecule; (2) from 8 to 220 parts by weight of an organosilicon compound selected from (a) a siloxane having the unit formula $(C_6H_5)_xR'_ySiO_{4-x-y/2}$ where R' is a monovalent hydrocarbon radical, x has an average value of 0.65 to 1.3, y has an average value of less than 0.4, the sum of x+y is from 0.95 to 1.3, at least 60 mole percent of said siloxane units are $(C_6H_5)SiO_{1.5}$ units, and said siloxane containing an average of at least 2 radicals per molecule selected from hydroxyl and —OM radicals where M is an alkali metal or quaternary ammonium radical, (b) a silanol of the general formula $(C_6H_5)_aR'_bSi(OH)_{4-a-b}$, where R' is a monovalent hydrocarbon radical, a has an average value of 0.65 to 1.3, b has an average value less than 0.4 and the sum of a+b is from 1 to 1.3, and at least 60 mole percent of said silanol being of the formula $(C_6H_5)Si(OH)_3$, (3) a catalytic amount of a silicon-bonded hydroxyl condensation catalyst; the concentration of solids in the solvent being such that no appreciable gelation occurs during heating; and (B) removing solvent from the reaction product obtained in step (A), there being sufficient agitation during such step (A) to keep the product substantially homogeneous.

Component (B) of the present invention is an amount of an organohydrogenpolysiloxane sufficient to provide from about 0.5 to about 5.0 silicon-bonded hydrogen atoms per silicon-bonded alkenyl radical in component (A)(iv).

The organohydrogensiloxane component is generally a relatively simple molecular structure and sometimes is a mixture of such materials. One characteristic of the organohydrogenpolysiloxane is that it contains at least an average of two silicon-bonded hydrogen atoms per molecule. Such organohydrogensiloxane may be either a hydride containing linear polysiloxane polymer or it may be a hydride containing silicon resin.

Organohydrogenpolysiloxanes which are useful as crosslinking agents are well known to the skilled artisan and need not be discussed in further detail. However, the reader interested in obtaining further information relating to suitable organohydrogenpolysiloxanes is referred to U.S. Pat. Nos. 3,527,655, 3,882,083, 4,061,609 and 4,329,273, all of which are hereby incorporated by reference into the instant disclosure.

Generally, per 100 parts by weight of block copolymer (A) there is utilized from about 1 to about 50 parts by weight of organohydrogenpolysiloxane crosslinking agent.

Component (C) is an amount of precious metal or precious metal containing catalyst effective for promoting an addition reaction between the alkenyl groups of block copolymer (A) and the hydrogen atoms of organohydrogenpolysiloxane (B). The precious metal catalyst component includes within its scope all of the well known platinum and rhodium catalysts as well as other less known noble metal hydrosilation catalysts.

Preferably there is utilized anywhere from 1 to 500 parts per million and, more preferably, from 1 to 200 parts per million of a platinum or platinum containing (as Pt metal) catalyst. Especially preferred platinum or platinum-containing catalysts include the platinum-hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid patents are incorporated by reference into the present disclosure for their teaching relating to hydrosilation catalysts.

In addition to required block copolymer (A), organohydrogenpolysiloxane (B) and catalyst (C), the artisan can include one or more optional ingredients well known in the art such as plasticizers, inhibitors, self-bonding additives, and the like.

While the curable compositions of the present invention can be prepared by merely mixing the various components together in any desired fashion, it is often found most convenient to prepare these compositions in two separate portions or packages which are combined at the time the compositions are to be converted to the solid, cured state. In the case of the two package formulation it is convenient to include in the first package block copolymer (A), precious metal catalyst (C), and any optional additives. The second package usually contains as its sole ingredient organohydrogenpolysiloxane (B), but as a matter of convenience the second package can also contain a portion of block copolymer (A) and some of the optional additives employed.

By adjusting the amount of block copolymer (A) in the second package the relative proportions of the two packages required to produce the compositions of the present invention are controlled. Generally the distribution of the components between the two packages is such that from 0.1 to 1 part by weight of the second package is employed per part of the first package. In selecting the components of the two packages, it is best not to include both the precious metal catalyst (C) and the organohydrogenpolysiloxane (B) in the same package.

When the two package system is employed the two components are merely mixed in suitable fashion at the point of use and the mixture is maintained at the curing temperature until curing has been completed. Generally complete cure can be obtained in times which vary from 24 hours at room temperature to 10 to 20 minutes at a temperature of about 100° C. The rate of cure is a function of both the concentration of the catalyst and the temperature of cure.

The cured composition is a clear, hard material suitable for use as a dirt-repellent top coat or as a conformal coating for electrical and electronic devices, as well as many other applications which will be obvious to the artisan.

The details of curing the compositions of the present invention depend upon the particular application. However, those skilled in the art will readily be able to determine optimum curing conditions without undue experimentation.

The following examples are illustrative of the practice of the present invention and are not intended to limit the scope of the claimed invention.

EXAMPLES

Example 1—Preparation of Block Copolymers

One hundred grams of silanol terminated polydimethylsiloxane having 6 repeating siloxane units on average per polymer chain were placed into a three-necked round bottom flask equipped with a thermometer and a stirrer along with 180 grams of toluene and 1000 grams of water. Sufficient agitation was applied to form a dispersion. In a pre-dried flask 125.4 grams of phenyltrichlorosilane, 9.8 grams of methyltrichlorosilane, 0.51 grams of vinylmethyldichlorosilane, and 180 grams of toluene were admixed. The chlorosilane admixture was then added to the dispersion in the three-necked flask through a Teflon ® tube over a two minute period. Agitation adequate to maintain the dispersion was applied during the addition during which time the reaction temperature increased from 20° C. to 60° C. Following addition of the chlorosilanes, mixing of the dispersion was continued for an additional thirty minutes. The aqueous phase containing hydrogen chloride by product was then separated from the organic phase which contained the organopolysiloxane block copolymer. The organopolysiloxane layer was washed four times with water and azeotroped for one hour to remove residual water and acid.

Additional block copolymers were prepared in the same manner wherein the dimethylpolysiloxane blocks contained 18, 34, 48 and 120 repeating siloxane units (n) on average per block (Examples 1a to 1e in Table I).

Another series block copolymer was prepared using the same method but the ratio of reactants was varied. Twenty five grams of silanol terminated dimethylpolysiloxane having an average of 24 repeating siloxane units per molecule, 90 grams of toluene and 500 grams of water were placed in a three-necked flask equipped with a thermometer and stirrer. Sufficient agitation was applied to form a dispersion. In a pre-dried flask, 70.5 grams of phenyltrichlorosilane, 5.5 grams of methyltrichlorosilane, 1.49 grams of vinylmethyldichlorosilane and 90 grams of toluene were mixed and added through a Teflon tube to the dispersion over a two minute period. The reaction temperature increased from room temperature to 55° C. during the addition and agitation. Stirring was continued for an additional 30 minutes after the addition. The aqueous phase was separated from the organic phase and the organopolysiloxane containing organic layer was washed four times with water and then azeotroped for one hour to remove residual water and acid.

Additional block copolymers were prepared in the same manner wherein the phenylsiloxane and methylsiloxane blocks were varied (Examples 1f to 1k in Table I).

TABLE I

| Example | (A)(i) | (A)(ii) | (A)(iii) | (A)(iv) |
|---------|--------|---------|----------|---------|
| 1a | 100 g (n = 6) | 125.4 g | 9.8 g | 0.51 g |
| 1b | 100 g (n = 18) | 125.4 g | 9.8 g | 0.51 g |
| 1c | 100 g (n = 34) | 125.4 g | 9.8 g | 0.51 g |
| 1d | 100 g (n = 48) | 125.4 g | 9.8 g | 0.51 g |
| 1e | 100 g (n = 120) | 125.4 g | 9.8 g | 0.51 g |
| 1f | 25 g (n = 24) | 70.5 g | 5.5 g | 1.49 g |
| 1g | 50 g (n = 24) | 70.5 g | 5.5 g | 1.49 g |
| 1h | 25 g (n = 24) | 105.8 g | 6.7 g | 1.18 g |
| 1i | 25 g (n = 24) | 70.5 g | 5.5 g | 1.0 g* |
| 1j | 25 g (n = 24) | 54.0 g | 3.8 g | 2.6 g |
| 1k | 148 g (n = 30) | 125.4 g | — | 3.7 g |

*Also includes equimolar amount of methyldicholorsilane so that vinyl and hydride are both on the same polymer chain.

Example 2—Compositions Prepared from Block Copolymers of Example 1

To 100 parts by weight of each of the block copolymers prepared in Example 1, there was added about 10 ppm of a platinum-containing catalyst and about 10 parts by weight of a hydride-containing silicone resin as a crosslinking agent. The mixture was cured to provide a composition suitable for use as a dirt-repellent top coating or as a conformal coating. The block copolymer and the appearance of the resulting composition are set forth in Table II.

The examples in Table II illustrate excellent compositions prepared by addition curing silicone block copolymers and hydride-containing polysiloxanes.

TABLE II

| Sample | Appearance of Cured Composition |
|--------|--------------------------------|
| 1a | Clear and tough, somewhat flexible |
| 1b | Clear and tough, somewhat flexible |
| 1c | Clear and tough, somewhat flexible |
| 1d | Clear and tough, somewhat flexible |
| 1e | Translucent and tough, somewhat flexible |
| 1f | Clear and hard |
| 1g | Clear, soft and flexible |
| 1h | Clear and hard |
| 1i | Clear and hard |
| 1j | Clear and hard |
| 1k | Clear, soft and flexible. |

I claim:

1. A curable composition comprising:
   (A) 100 parts by weight of an organopolysiloxane block copolymer comprising:
   (i) at least one siloxane block consisting essentially of from about 6 to about 120 units of the formula

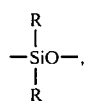

(ii) at least one siloxane block consisting essentially of from about 3 to about 160 units of the formula

(iii) optionally, at least one siloxane block consisting essentially of from 1 to about 80 units of the formula

and
   (iv) at least one siloxane block consisting essentially of from about 0.1 mole percent to about 10 mole percent of the sum of (i), (ii) and (iii) of units of the formula

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms; and $R^3$ is selected from alkenyl radicals of 2 to 5 carbon atoms;
   (B) an amount of organohydrogenpolysiloxane sufficient to provide from about 0.5 to about 5.0 silicon-bonded hydrogen atoms per silicon-bonded alkenyl radical; and
   (C) an amount of precious metal or precious metal containing catalyst effective for promoting an addition reaction between said silicon-bonded alkenyl radicals of (A)(iv) and said silicon-bonded hydrogen atoms of (B).

2. The composition of claim 1 wherein the siloxane block of (A)(i) consists essentially of from about 6 to about 50 units of the formula

where R is selected from substituted and unsubstituted alkyl radicals of 1 to 5 carbon atoms and substituted and unsubstituted aryl and alkaryl radicals of 6 to 10 carbon atoms.

3. The composition of claim 2 wherein the siloxane block of (A)(ii) consists essentially of from about 4 to about 75 units of the formula

where $R^1$ is selected from substituted and unsubstituted aryl and alkaryl radicals of 6 to 10 carbon atoms.

4. The composition of claim 3 wherein the siloxane block of (A)(iii) consists essentially of from 1 to about 8 units of the formula

where $R^2$ is selected from substituted and unsubstituted alkyl radicals of 1 to 5 carbon atoms.

5. The composition of claim 4 wherein the siloxane block of (A)(iv) consists essentially of from about 0.5 to about 3 mole percent of the sum of (A)(i), (A)(ii) and (A)(iii) of units of the formula

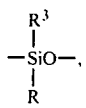

where R is selected from substituted and unsubstituted alkyl radicals of 1 to 5 carbon atoms and substituted and unsubstituted aryl and alkaryl radicals of 6 to 10 carbon atoms, and $R^3$ is selected from alkenyl radicals of 2 to 5 carbon atoms.

6. The composition of claim 5 wherein R and $R^2$ are methyl, $R^1$ is phenyl and $R^3$ is vinyl or allyl.

7. The composition of claim 1 wherein there is present from 1 to about 50 parts by weight of organohydrogenpolysiloxane per 100 parts by weight of organopolysiloxane block copolymer.

8. The composition of claim 1 wherein there is present from 1 to 500 parts per million of a platinum or platinum-containing catalyst, as platinum metal.

9. The composition of claim 5 wherein there is present from 1 to 200 parts per million of a platinum or platinum-containing catalyst, as platinum metal.

10. A curable composition comprising:
(A) 100 parts by weight of an organopolysiloxane block copolymer comprising:
(i) at least one siloxane block consisting essentially of from about 6 to about 50 units of the formula

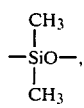

(ii) at least one siloxane block consisting essentially of from about 4 to about 75 units of the formula

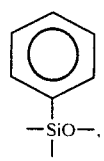

(iii) at least one siloxane block consisting essentially of from 1 to about 8 units of the formula

(iv) at least one siloxane block consisting essentially of from about 0.5 to about 3 mole percent of the sum of (i), (ii) and (iii) of units of the formula

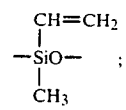

(B) an amount of organohydrogenpolysiloxane sufficient to provide from about 0.5 to about 5.0 silicon-bonded hydrogen atoms per silicon-bonded vinyl radical; and
(C) from 1 to 200 parts per million of a platinum or platinum-containing catalyst, as platinum metal.

11. A method for making a curable composition comprising mixing:
(A) 100 parts by weight of an organopolysiloxane block copolymer comprising:
(i) at least one siloxane block consisting essentially of from about 6 to about 120 units of the formula

(ii) at least one siloxane block consisting essentially of from about 3 to about 160 units of the formula

(iii) optionally, at least one siloxane block consisting essentially of from 1 to about 80 units of the formula

(iv) at least one siloxane block consisting essentially of from about 0.1 mole percent to about 10 mole percent of the sum of (i), (ii) and (iii) of units of the formula

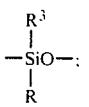

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms; and $R^3$ is selected from alkenyl radicals of 2 to 5 carbon atoms;

(B) an amount of organohydrogenpolysiloxane sufficient to provide from about 0.5 to about 5.0 silicon-bonded hydrogen atoms per silicon-bonded alkenyl radical; and (C) an amount of precious metal or precious metal containing catalyst effective for promoting an addition reaction between said silicon-bonded alkenyl radicals of (A)(iv) and said silicon-bonded hydrogen atoms of (B).

12. The method of claim 11 wherein the siloxane block of (A)(i) consists essentially of from about 6 to about 50 units of the formula

where R is selected from substituted and unsubstituted alkyl radicals of 1 to 5 carbon atoms and substituted and unsubstituted aryl and alkaryl radicals of 6 to 10 carbon atoms.

13. The method of claim 12 wherein the siloxane block of (A)(ii) consists essentially of from about 4 to about 75 units of the formula

where R is selected from substituted and unsubstituted alkyl radicals of 1 to 5 carbon atoms and substituted and unsubstituted aryl and alkaryl radicals of 6 to 10 carbon atoms.

14. The method of claim 13 wherein the siloxane block of (A)(iii) consists essentially of from 1 to about 8 units of the formula

where $R^2$ is selected from substituted and unsubstituted alkyl radicals of 1 to 5 carbon atoms.

15. The method of claim 14 wherein the siloxane block of (A)(iv) consists essentially of from about 0.5 to about 3 mole percent of the sum of (A)(i), (A)(ii) and (A)(iii) of units of the formula

where R is selected from substituted and unsubstituted alkyl radicals of 1 to 5 carbon atoms and substituted and unsubstituted aryl and alkaryl radicals of 6 to 10 carbon atoms, and $R^3$ is selected from alkenyl radicals of 2 to 5 carbon atoms.

16. The method of claim 15 wherein R and $R^2$ are methyl, $R^1$ is phenyl and $R^3$ is vinyl or allyl.

17. The method of claim 11 wherein there is present from 1 to about 50 parts by weight of organohydrogenpolysiloxane per 100 parts by weight of organopolysiloxane block copolymer.

18. The method of claim 11 wherein there is present from 1 to 500 parts per million of a platinum or platinum-containing catalyst, as platinum metal.

19. The method of claim 15 wherein there is present from 1 to 200 parts per milliion of a platinum or platinum-containing catalyst, as platinum metal.

20. A composition of matter obtained by curing a mixture comprising:

(A) 100 parts by weight of an organopolysiloxane block copolymer comprising:

(i) at least one siloxane block consisting essentially of from about 6 to about 120 units of the formula

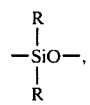

(ii) at least one siloxane block consisting essentially of from about 3 to about 160 units of the formula

(iii) optionally, at least one siloxane block consisting essentially of from 1 to about 80 units of the formula

and (iv) at least one siloxane block consisting essentially of from about 0.1 mole percent to about 10 mole percent of the sum of (i), (ii) and (iii) of units of the formula

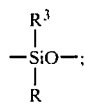

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms; and $R^3$ is selected from alkenyl radicals of 2 to 5 carbon atoms;

(B) an amount of organohydrogenpolysiloxane sufficient to provide from about 0.5 to about 5.0 silicon-bonded hydrogen atoms per silicon-bonded alkenyl radical; and (C) an amount of precious metal or precious metal containing catalyst effective for promoting an addition reaction between said silicon-bonded alkenyl radicals of (A)(iv) and said silicon-bonded hydrogen atoms of (B).

21. A method of making a composition of matter comprising:
I. mixing:
(A) 100 parts by weight of an organopolysiloxane block copolymer comprising:
(i) at least one siloxane block consisting essentially of from about 6 to about 120 units of the formula

(ii) at least one siloxane block consisting essentially of from about 3 to about 160 units of the formula

(iii) optionally, at least one siloxane block consisting essentially of from 1 to about 80 units of the formula

and
(iv) at least one siloxane block consisting essentially of from about 0.1 mole percent to about 10 mole percent of the sum of (i), (ii) and (iii) of units of the formula

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms; and $R^3$ is selected from alkenyl radicals of 2 to 5 carbon atoms;
(B) an amount of organohydrogenpolysiloxane sufficient to provide from about 0.5 to about 5.0 silicon-bonded hydrogen atoms per silicon-bonded alkenyl radical; and
(C) an amount of precious metal or precious metal containing catalyst effective for promoting an addition reaction between said silicon-bonded alkenyl radicals of (A)(iv) and said silicon-bonded hydrogen atoms of (B); and
II. allowing the mixture to cure.

22. The method of claim 21 wherein curing is effected at room temperature.

23. The method of claim 21 wherein curing is effected at an elevated temperature.

24. The method of claim 23 wherein said elevated temperature is about 100° C.

25. An article of manufacture comprising:
I. a substrate and
II. a coating composition cured to at least one surface of said substrate, said coating composition being obtained by airing a mixture comprising:
(A) 100 parts by weight of an organopolysiloxane block copolymer comprising:
(i) at least one siloxane block consisting essentially of from about 6 to about 120 units of the formula

(ii) at least one siloxane block consisting essentially of from about 3 to about 160 units of the formula

(iii) optionally, at least one siloxane block consisting essentially of from 1 to about 80 units of the formula

and
(iv) at least one siloxane block consisting essentially of from about 0.1 mole percent to about 10 mole percent of the sum of (i), (ii) and (iii) of units of the formula

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms; and $R^3$ is selected from alkenyl radicals of 2 to 5 carbon atoms;
(B) an amount of organohydrogenpolysiloxane sufficient to provide from about 0.5 to about 5.0 silicon-bonded hydrogen atoms per silicon-bonded alkenyl radical; and
(C) an amount of precious metal or precious metal containing catalyst effective for promoting an addition reaction between said silicon-bonded alkenyl radicals of (A)(iv) and said silicon-bonded hydrogen atoms of (B).

26. The article of manufacture of claim 25 wherein the substrate having a coating thereon is an electrical or electronic component.

27. A method of making an article of manufacture comprising:

I. applying to least one surface of a substrate a curable composition comprising:

(A) 100 parts by weight of an organopolysiloxane block copolymer comprising:

(i) at least one siloxane block consisting essentially of from about 6 to about 120 units of the formula $$-\underset{\underset{R}{|}}{\overset{\overset{R}{|}}{Si}}O-,$$

(ii) at least one siloxane block consisting essentially of from about 3 to about 160 units of the formula

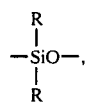

(iii) optionally, at least one siloxane block consisting essentially of from 1 to about 80 units of the formula

and (iv) at least one siloxane block consisting essentially of from about 0.1 mole percent to about 10 mole percent of the sum of (i), (ii) and (iii) of units of the formula $$-\underset{\underset{R}{|}}{\overset{\overset{R^3}{|}}{Si}}O-;$$

where R is selected from substituted and unsubstituted alkyl radicals of 1 to 5 carbon atoms and substituted and unsubstituted aryl and alkaryl radicals of 6 to 10 carbon atoms; $R^1$ is selected from substituted and unsubstituted aryl and alkaryl radicals of 6 to 10 carbon atoms; $R^2$ is selected from substituted and unsubstituted alkyl radicals of 1 to 5 carbon atoms, and $R^3$ is selected from alkenyl radicals of 2 to 5 carbon atoms;

(B) an amount of organohydrogenpolysiloxane sufficient to provide from about 0.5 to about 5.0 silicon-bonded hydrogen atoms per silicon-bonded alkenyl radical; and (C) an amount of precious metal or precious metal containing catalyst effective for promoting an addition reaction between said silicon-bonded alkenyl radicals of (A)(iv) and said silicon-bonded hydrogen atoms of (B); and II. allowing said curable composition to cure.

28. The method of claim 27 wherein the curable composition is cured at room temperature.

29. The method of claim 27 wherein the curable composition is cured at an elevated temperature.

30. The method of claim 29 wherein said elevated temperature is about 100° C.

* * * * *